United States Patent [19]

Ludwig

[11] 4,060,171
[45] Nov. 29, 1977

[54] QUICK CATCH AND RELEASE CLAMP FOR RELEASEABLY HOLDING A SPARE TIRE OF A VEHICLE

[76] Inventor: Duane H. Ludwig, Box 216, Sioux Rapids, Iowa

[21] Appl. No.: 675,152

[22] Filed: Apr. 8, 1976

[51] Int. Cl.² .................................... B62D 43/04
[52] U.S. Cl. ........................... 214/451; 224/42.23
[58] Field of Search ............. 224/42.21, 42.23, 42.25, 224/42.06, 42.24, 42.12, 29 R; 214/451, 454, 452, 453; 254/77, 78, 120; 70/259, 260

[56] References Cited

U.S. PATENT DOCUMENTS

| 2,089,679 | 8/1937 | Williams | 254/78 |
|---|---|---|---|
| 2,449,544 | 9/1948 | Ballard | 224/42.23 |
| 2,563,810 | 8/1951 | Ballard | 214/451 |
| 2,777,591 | 1/1957 | Manzatuik | 214/451 |
| 3,820,817 | 6/1974 | Harold | 280/179 A |

FOREIGN PATENT DOCUMENTS 601,168 12/1959 Italy .................................. 214/453

Primary Examiner—Robert J. Spar
Assistant Examiner—Jerold M. Forsberg
Attorney, Agent, or Firm—Zarley, McKee, Thomte, Voorhees & Sease

[57] ABSTRACT

A quick catch and release clamp for releaseably holding an automotive tire in supporting engagement with the underside of the frame of a truck or the like. The clamp is comprised of an upstanding support post, a clamp means having a bottom portion extending towards the top of the support post, with a toggle link pivotally mounted at one end to the top portion of the support post and pivotally mounted at its other end to the bottom portion of the clamp means, with the toggle link having an associated means to move a part of the toggle link, including its pivotal mounting to the top portion of the support post above the pivotal mounting at the other end of the toggle link, and past the longitudinal axis of the clamp means.

8 Claims, 4 Drawing Figures

QUICK CATCH AND RELEASE CLAMP FOR RELEASEABLY HOLDING A SPARE TIRE OF A VEHICLE

BACKGROUND OF THE INVENTION

With certain types of vehicles, which do not have a convenient interior compartment for storing a spare tire, it is very often common to store the spare tire on the underside of the vehicle frame, rigidly clamped in secured relationship to the vehicle frame. Such clamping arrangements, of course, hold the tire in releaseable securement, the tire being typically released by unthreading a nut in order to release the tire-holding brace.

The problem with such types of tire-holding devices is that the underside of a vehicle during use is continually subjected to a variety of different environmental conditions. For example, rain, snow and the like. Such adverse environmental conditions often cause rusting of the frame and of the tire-holding clamp and in many cases foreign materials such as mud and the like become caked around the bolt and nut which holds the clamp in secured relationship. Thus, if the spare tire is not continually removed after extended periods of nonuse the nut may become rusted to a locking bolt thereby making removal difficult, and in many cases virtually impossible without destroying the clamping device.

This invention has as its object to provide a quick catch and release clamp for securing and releaseably holding a tire against the frame of a vehicle. The clamp can be released and again clamped without depending upon the necessity for threading and unthreading a nut from a bolt and therefore is immune to interference from rusting or foreign material as heretofore explained.

Another object of this invention is to provide a quick catch and release tire clamping device which can be clamped and released without the necessity for accessory tools such as wrenches and the like.

Yet another object of this invention is to provide a quick catch and release clamp which is of simple construction, easy to manufacture, dependable in use, and compact.

The manner of accomplishing these and other objects of the invention will become apparent from the detailed description of the invention which follows:

DETAILED DESCRIPTION OF THE INVENTION

Figure 1:
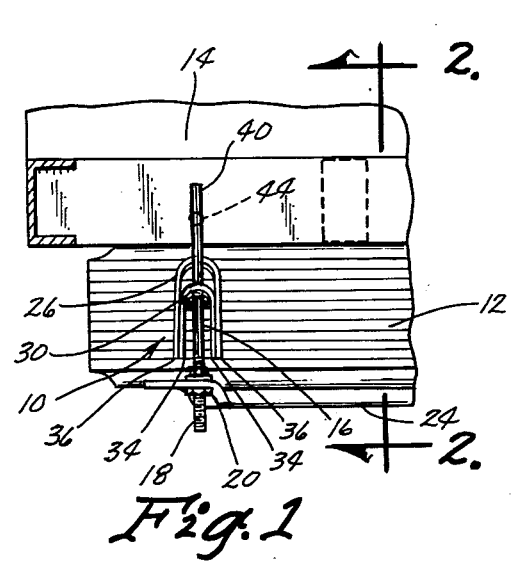
FIG. 1 is an elevated view of the device of this invention showing a tire clamped to the frame of a vehicle.
Figure 2:
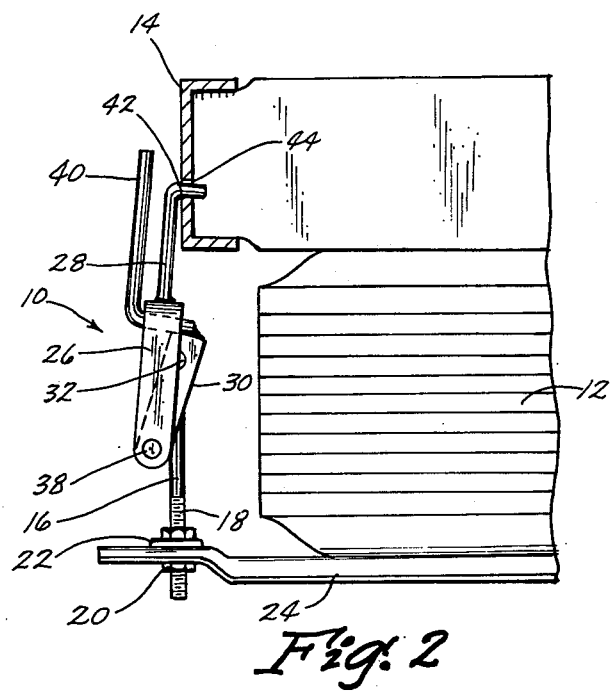
FIG. 2 is an elevated view of the device shown in FIG. 1 along line 2—2 showing the side of the clamp of this invention.

The clamp device of this invention 10 is designed to hold in releaseable secured engagement a tire 12 to the underneath portion of a vehicle frame 14. The clamp has an upstanding support post 16 having a bottom threaded portion 18 for threadably receiving nuts 20, and washer 22 which attach support post 16 to tire supporting brace 24 at one end thereof. The opposite end of tire support brace 24, not depicted in the drawings, is, of course, pivotally mounted to the frame of the vehicle for swinging movement from a tire supporting position as shown in FIGS. 1 and 2 to a releasing position shown in FIGS. 3 and 4.

A clamping means, comprised of inverted U-shaped member, or stirup, 26, extends with its open end towards the top portion of support post 16. Mounted to the top outer surface of inverted U-clamp 26 is an inverted L-shape hook member 28 which can be hooked to the vehicle frame 14 as depicted.

Figure 3:
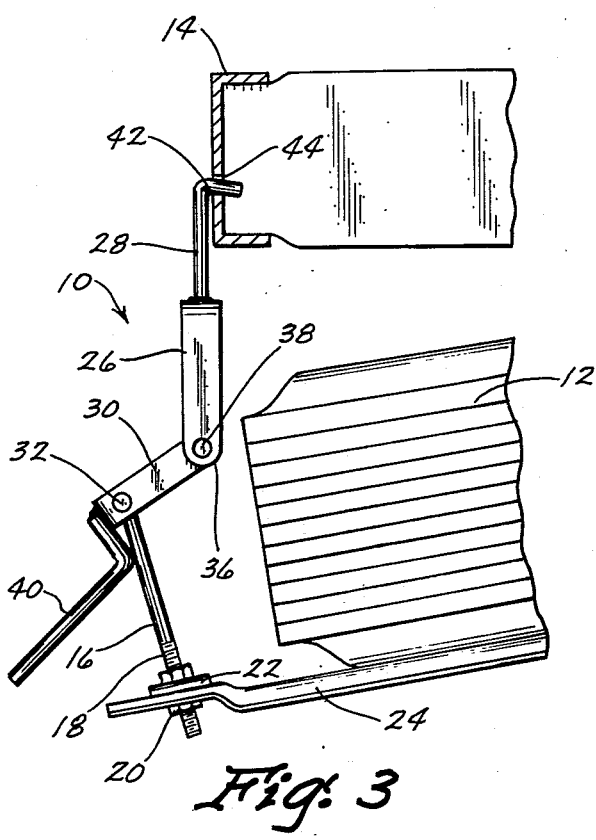
FIG. 3 is a side view, similar to the view in FIG. 2, showing the clamp of this invention in its released position.

Toggle link 30 is pivotally mounted to the top portion of support post 16 via pin 32 which extends through support post 16 and the bottom portion of toggle link 30 so that toggle link 30 may be pivoted about pin 32 which is in transverse relationship to the longitudinal axis of upstanding support post 16. As best seen in FIGS. 1 and 3, toggle link 30 is a second U-shaped member which is of a sufficient width such that it can pass through the opening of the inverted U-shaped portion of inverted U-clamp 26. The outer ends of toggle link 32 are pivotally mounted to the ends 36 of inverted U-clamp 26 by pins 38. Thus as can be seen toggle link 30 is pivotally mounted at one end to the top portion support post 16 and is pivotally mounted at its other end to the ends 36 of inverted U-clamp 26.

Mounted to the outer or bottom surface of toggle link 30 is L-shaped hand lever 40 with the opening of the L oriented towards inverted U-clamp 26.

Inverted L-shaped hook 28 as positioned, at its bend has notch 42 which functions to hold inverted L-shaped hook 28 in engagement with the edge of a vehicle frame defined by the hole 44 in the frame which receives hook 28. In this manner the clamp is prevented from loosening by jarring during use of the vehicle.

Figure 4:
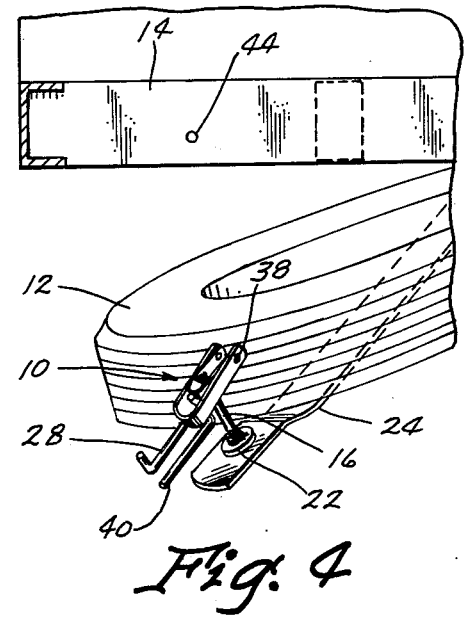
FIG. 4 shows the clamp of this invention with the clamp unhooked from the frame of the truck and a tire in position for either removal or clamping.

On actual operation the clamp works as follows: Assuming that a tire is being put into position as depicted in FIG. 4. The tire 12 is laid against tire support brace 24, the bottom portion of support post 16 is attached to the outer end of tire support brace 24 via nuts 20 and washer 22 in conventional fashion. The hook portion of inverted L-shaped hook 28 is placed through aperture 44 and notch 42 engages the edge of aperture 44 of the vehicle frame 14. The operator grasps hand lever 40 and pushes it upwardly towards the vehicle frame 14. Toggle link 30 pivots upwardly towards inverted U-clamp 26 about the axis defined by pin 38 and tire support brace 24 is pulled upwardly towards the vehicle frame 24. With the upward movement of handle 40 the orientation of upstanding support post 16 continually changes since it is pivotally mounted to toggle link 30 via pin 32. Eventually toggle link 30 is moved to an inverted U-shaped position as depicted in FIG. 1 and is received in the opening of inverted U-clamp 26. Since the opening of L-shaped hand lever 40 is oriented towards inverted U-clamp 26 toggel link 30 can be pivoted past the longitudinal axis of inverted U-clamp 26 until handle 40 is in abutting relationship with the top edge of inverted U-clamp 26, as depicted in FIG. 2, so that toggle link 30 and it pivotal mounting to the top portion of support post 16 via pin 32 is pivoted above the pivotal mounting of toggle link 32, clamp 26, past the longitudinal access of clamp means 36. Thus, downwardly exerted pressure on brace 24 tends to hold the clamp 10 in tighter engagement with the vehicle frame 14. Of course to release, the clamp handle 40 is grasped by the operator and swung arcuately downwardly from the clamping position shown in FIG. 2 to the open position shown in FIG. 3, and if the tire is to be removed, hook 28 is removed from engagement with frame 14.

Thus, as can be seen, an easy to employ, quick catch and release clamp has been provided which can be employed without the aid of any further tools in order to clamp and release a vehicle spare tire and which can be employed without interference caused by rusting or adverse environmental conditions to which the bottom portion of a vehicle is subjected. The invention therefore accomplishes at least all of the stated objects.

I claim:

1. A quick catch and release clamp for supporting a tire beneath the frame of a vehicle comprising, an upstanding support post having top and bottom ends, said bottom end being adapted for rigid but detachable attachment to a tire-holding brace, a clamp means comprised of an inverted U-shaped bottom member extending toward the top of said support post and a rigid inverted L-shaped hooked top member fixedly attached to the bridge portion of said U-shaped member and projecting outwardly therefrom, adapted for engaging an aperture of said vehicle frame for releasable securement thereto, a toggle link pivotally mounted at one end to the top portion of said support post and pivotally mounted at its other end to the bottom portion of said clamp means, means to move part of said toggle link, including the pivotal mounting thereof to the top portion of said support post, above the pivotal mounting at said other end of said toggle link and past the longitudinal axis of said clamp means to a locked position, and a tire holding brace means associated with said support post for movement into a tire securing position upon movement of said toggle link to its locked position, whereby when said clamp means is in its unlocked position the L-shaped hooked member may be easily released from said aperture and the brace means lowered to facilitate loading or unloading of a tire.

2. The device of claim 1 wherein said toggle link is U-shaped, with the bottom portion of said U being pivotally mounted to the top of said support post.

3. The device of claim 1 wherein said inverted U portion is pivotally mounted to said U-shaped toggle link near the open end portion of said toggle link.

4. The device of claim 3 wherein said U-shaped toggle link is of such dimensions that it can pass through the opening of the inverted U-shaped portion of said clamp means.

5. The device of claim 3 wherein said means to move part of said toggle link above the pivotal mounting of said toggle link to the bottom portion of said clamp means, is a hand lever mounted to said toggle link.

6. The device of claim 5 wherein said hand lever is L-shaped.

7. The device of claim 6 wherein said upstanding support post has its bottom end threaded for receipt of a tire-holding brace and securement of said brace by a nut threadably received thereon.

8. The device of claim 1 wherein the inverted L-shaped hooked top member is notched to engage the edge of the aperture of said vehicle frame.

* * * * *